United States Patent [19]

Thorne-Booth

[11] 3,728,539

[45] Apr. 17, 1973

[54] METHOD AND APPARATUS FOR CONTROLLING A VEHICLE CONTROL SIGNAL

[75] Inventor: George M. Thorne-Booth, Tarzana, Calif.

[73] Assignee: Westinghouse Electric Corporation, Pittsburgh, Pa.

[22] Filed: Apr. 8, 1971

[21] Appl. No.: 132,379

[52] U.S. Cl. ........................... 246/182 B, 246/187 B
[51] Int. Cl. ................................................ B61l 3/12
[58] Field of Search ..................... 246/182 B, 187 B

[56] References Cited

UNITED STATES PATENTS

| 3,524,055 | 8/1970 | Smith | 246/182 B |
| 3,639,754 | 2/1972 | Kovalcik et al. | 246/182 B |
| 3,679,879 | 7/1972 | Seki et al. | 246/182 B |
| 3,300,639 | 1/1967 | Bowman et al. | 246/182 B |

Primary Examiner—Robert G. Sheridan
Assistant Examiner—George H. Libman
Attorney—F. H. Henson, R. G. Brodahl and Jack M. Arnold

[57] ABSTRACT

A vehicle traveling along a vehicle travel path is provided a deceleration signal which is proportional to the quantity $K2/Dt^2$, where D is the distance the vehicle has to travel to a stopping position, $t$ is a time reference relative to how long it takes the vehicle to travel the distance D, and K2 is an operational constant determined by system parameters. The quantity $t^2$ is computed by generating a predetermined number progression grouping of pulses, the sum of which is equal to the quantity $t^2$.

8 Claims, 7 Drawing Figures

INVENTOR
George M. Thorne-Booth

BY
ATTORNEY

COMPUTER START CIRCUIT

FIG. 6

TIMER

FIG. 7

ODD NUMBER PROGRESSION GENERATOR 3,728,539

METHOD AND APPARATUS FOR CONTROLLING A VEHICLE CONTROL SIGNAL

CROSS REFERENCES TO RELATED APPLICATIONS

Reference is made to the following copending patent application and U.S. Patent:

Ser. No. 887,825, filed Dec. 24, 1969 and titled "Remote Signalling System for Train Control" by George M. Thorne-Booth which is assigned to the assignee of the present invention.

U.S. Pat. No. 3,593,022, filed Sept. 25, 1968 and titled "Control of a Vehicle Along a Path Divided Into a Plurality of Signal Blocks" by Robert C. Hoyler and George M. Thorne-Booth which is assigned to the assignee of the present invention.

BACKGROUND OF THE INVENTION

In any vehicle control system and especially in a vehicle control system where the vehicles travel at a relatively high rate of speed, with a minimum headway between the vehicles there is a need for decelerating and eventually stopping the vehicle in a relatively smooth manner for the comfort and safety of the passenger on board the vehicle, as well as for the safety of any cargo which may be on the vehicle. In prior art vehicle deceleration systems an operator is needed to affect the deceleration of the vehicle or alternatively a control system is needed in which the acceleration of the vehicle is monitored from an accelerometer, the velocity of the vehicle is monitored from a tachometer, and the distance the vehicle has to travel to its stopping point is monitored by some means such as a counter.

The teachings of the present invention disclose a control system which provides a vehicle control signal such as a deceleration signal without the need to use an accelerometer or a tachometer, but rather through the use of a digital logic system responsive to position signals generated by the vehicle as it travels along a vehicle travel path.

SUMMARY OF THE INVENTION

In accordance with the teachings of the present invention, a vehicle control system is disclosed for a vehicle traveling along a vehicle travel path. Means are provided for sensing the vehicle's position along the vehicle travel path and vehicle position signals are provided in response to the sensing. A counter has the initial distance the vehicle has to travel to a selected one of the predetermined positions stored therein in response to sensing a given one of the vehicle position signals, and the counter counts in response to each vehicle position signal provided for generating successive counts indicative of the remaining distance the vehicle has to travel to a selected one of the predetermined positions. A signal source provides periodic clock pulses and in response to a predetermined number of the periodic clock pulses timing signals are provided. A predetermined number progression grouping of the periodic clock pulses is provided during the time interval between position signals, with each successive group of clock pulses in the progression being provided at a time determined by the timing signal. There are included means operative with the counter and responsive to each clock pulse in the predetermined number progression grouping for forming a summation of the count stored in the counter to provide a sum signal. There are also included means responsive to the sum signal for providing a vehicle control signal.

DESCRIPTION OF THE PREFERRED EMBODIMENT

In accordance with the teaching of the present invention, a vehicle control signal, for example, a deceleration signal for a vehicle, is derived from a digital logic circuit. The logic circuit is illustrated in hardware form, however, it is to be appreciated that a properly programmed general purpose digital computer could perform all of the functions performed by the logic circuit illustrated. The deceleration signal is derived by sensing predetermined fixed increments of position along the vehicle travel path. With a fixed increment of distance between positions being known, the velocity of the vehicle may be derived in relation to the increments of distance without resorting to the need of a tachometer as used in known deceleration systems. The present invention solves the following equations whereby the deceleration signal or command for the vehicle is derived:

$$\text{Deceleration} = K1\, V^2/D \quad (1)$$

where:
K1 = an operational constant
V = velocity
D = stopping distance $$V = d/t \quad (2)$$

where:
d = incremental distance between positions, for example, 6 inches
t = time
substitute (2) in (1)

$$\text{Deceleration} = K1\, d^2/Dt^2 \quad (3)$$

$$\text{Deceleration} = K2/Dt^2 \quad (4)$$

where $K1 d^2 = K2$ $$t^2 = \sum_{n=1}^{t}(2n-1) \quad (5)$$

where:

$n$ = number of timing pulses (a 1 μsec pulse every msec).

The equation above solves for $t^2$ by use of an odd number progression. For example, if $t = 3$

| $n$ | $(2n-1)$ |
|---|---|
| 1 | 1 |
| 2 | 3 |
| 3 | 5 |

$$t^2 = 3^2 = (1 + 3 + 5) = 9 \qquad (6)$$

It is known, that multiplication can be performed by successive additions: Example $2 \times 3 = 2 + 2 + 2 = 6$.

$$Dt^2 = \frac{D + D + D \ldots + D}{t^2 \text{ additions}} \qquad (7)$$

Therefore, by the use of (5) and (7)

$$Dt^2 = D \sum_{n=1}^{t} (2n - 1) \qquad (8)$$

If $t = 3$ $$\begin{aligned} Dt^2 &= D(1 + 3 + 5) \\ &= (D \times 1) + (D \times 3) + D \times 5 \\ &= (D) + (D + D + D) + (D + D + D + D + D) \\ &= 9D \end{aligned} \qquad (9)$$

It may be seen, therefore, from the equations above that the equation Deceleration = $K2/Dt^2$ may be solved by taking the resultant signal which for example may be derived from a digital logic circuit which solves equation (9) and is indicative of $Dt^2$. This signal may then be applied to an inverting device and the output of the inverting device may then be applied to an amplifier, which is scaled to include a factor equal to K2. The operation of the circuits used to solve equation (9) is described shortly.

Figure 1:
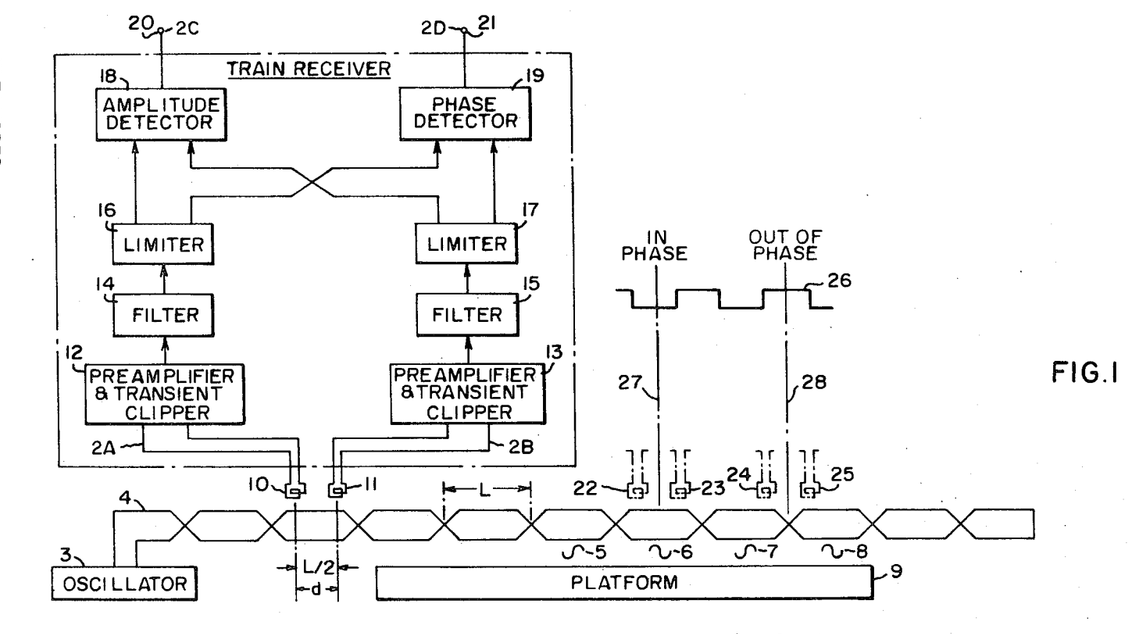
FIG. 1 is a schematic and block diagram representation of a vehicle position sensing and position signal generating device which may be used in the practice of the present invention.
Figure 2:
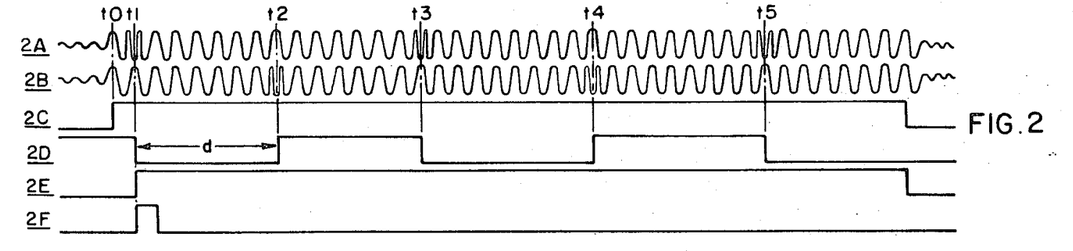
FIG. 2 is a waveform relationship helpful in the understanding of the diagrams as illustrated in FIGS. 1, 5 and 6.

Referring now to FIG. 1 there is illustrated a schematic and block diagram representation of a wayside signal source and a vehicle mounted receiving apparatus which may be used in the practice of the invention for deriving the vehicle position signals. It is to be appreciated however that many other suitable devices used for providing vehicle position signals may also be used in the practice of the invention. An oscillator 3 generates a continuous wave signal which is applied to a periodically transposed cable 4 which is situated in a fixed position on the vehicle railway track wayside. The transposed cable 4 is used as a transmitting antenna which provides electromagnetic energy which alternately reverses itself with each consecutive transposed section of the cable. This is schematically depicted in FIG. 1 for four of the transposition sections of cable 4 by phase symbols, i.e., sine waves, below those sections as shown at 5, 6, 7 and 8 respectively. The cable 4 is used to monitor position relative to a stopping position adjacent a passenger or cargo platform 9. The stopping point or position for a particular vehicle is determined by the length of the vehicle. A pair of spaced receiving antennas 10 and 11 are carried by the vehicle and are positioned such that they pass above the transposed cable as the vehicle travels over the cable. The receiving antennas are positioned sufficiently close to and above the cable such that when an individual antenna is above a transposition section of cable, it senses signals from that section in preference to signals flowing through other sections of the cable. It is to be understood, however, that the receiving antennas have enough distance separating them from the cable to couple with the cable in accordance with the well known principles of field electromagnetic behavior.

In the illustrated situation the interval of transposition is indicated schematically by the letter L which for example may be an increment of 12 inches, and the fixed longitudinal spacing of the two receiving antennas is L/2 which is a fixed increment of distance which may, for example, be 6 inches. In the discussion which follows, the fixed increment of distance L/2 which is 6 inches corresponds to the incremental distance $d$ which is used in the equation (2) above and is the reference distance that is used in the computation of the velocity of the vehicle in the system disclosed. As the receiving antennas move along the cable, they respectively receive signals which are alternately in-phase and out-of-phase with one another depending on the position of the antennas relative to the transposed cables.

The signals received by the receiving antennas are coupled to two separate channels. The antenna 10 couples a signal (waveshape 2A, FIG. 2) to a preamplifier and transient clipper stage 12 and the receiving antenna 11 couples a signal (waveshape 2B, FIG. 2) to a preamplifier and transient clipper 13. Each of the respective preamplifiers and transient clipper stages are then coupled to filters 14 and 15 respectively and then to limiter stages 16 and 17 respectively. The output signals from the limiters 16 and 17 are each coupled to an amplitude detector 18 and a phase detector 19.

The phase detector 19 is of a type which detects the relative in-phase and out-of-phase relationship of the signals in the two channels such as the type in which these signals are multiplied together. The output of the phase detector is a signal indicating either the in-phase or the out-of-phase relationship of the two channels.

The amplitude detector 18 is a standard amplitude detector which provides an output signal when either or both of the input signals from the limiters 16 and 17 respectively are at a predetermined signal level. The circuit is designed such that the amplitude detector provides an output signal (waveshape 2C, FIG. 2) at a time slightly before the phase detector provides an output signal. This is seen at the time $t0$ as illustrated in FIG. 2.

The antennas 10 and 11 begin to sense the signal flowing through the transposed cable 4 a finite amount of time prior to the antennas actually being positioned above the transposed cable and this is illustrated by the low magnitude signal in waveshapes 2A and 2B of FIG. 2 at the time prior to $t0$. The output signal from the amplitude detector is manifested at an output terminal 20.

The phase detector begins to sense the phase relationships in the two channels at a time $t1$ as depicted in FIG. 2 and the first such sensing of a phase change or a position signal is shown by the negative going edge of the waveshape 2D as depicted in FIG. 2. The provision of the next position signal or phase change is indicative of the vehicle having traveled the incremental distance $d$ as illustrated by the positive going portion of the waveshape 2D at time *t*2 as illustrated in FIG. 2. This is the second position signal indication. This repeats itself at the times *t*3 and *t*4 and *t*5 as succeeding position signals are generated. The position signals which are provided at an output terminal 21 as well as the sufficient amplitude signal provided at terminal 20 are used to control certain logic elements illustrated in FIG. 3. This will be explained shortly.

The mode of operation of the antennas relative to the transposed cable 4 is diagrammatically illustrated in FIG. 1 by the phantom line alternate positions 22, 23 and 24, 25 of the pair of antennas, and the waveform 26. The waveform 26 represents the instantaneous output conditions corresponding to the position of the center line between the pair of receiving antennas 10, 11 relative to the transposed cable 4. This center has been shown by the dashed vertical lines 27 and 28 positioned midway between the receiving antennas for alternate positions 22, 23 and 24, 25, respectively. The positions 22, 23 of the antennas are such that they receive in-phase signals from the transposed cables and at this instant the output of the phase detector is at its high logic state or binary one condition, as shown by the waveform 26. As the vehicle moves over the cable in a direction from left to right as shown in FIG. 1, the antennas move to positions 24, 25, where they then receive signals from the transposed cables such that the received signals are out-of-phase and the output signal from the phase detector is at its low state or binary zero condition as shown by the waveshape 26. As the vehicles moves along the track, the output of the phase detector is provided at a frequency which is twice the frequency at which the vehicle passes transposition sections. This signal is then transmitted to the logic circuitry of FIG. 3, which utilizes the position of the vehicle to derive the vehicle control signal, namely the deceleration signal.

The time between phase changes or position signals increases as the speed of the vehicle decreases since it takes a longer period of time for the vehicle to travel the incremental distance *d*. As was explained above, the velocity of the vehicle may be calculated with reference to the time it takes the vehicle to traverse the incremental distance *d*. It is seen, therefore, that each phase change of the signal provided at the output terminal 21 of the phase detector is a vehicle position signal which is an indication of the number of cross-overs of the transposed cable that the vehicle has passed over. The vehicle has traveled the distance *d* between the provision of each position signal. A count of these position signals is used for the purpose of controlling the speed of the vehicle to derive a desired deceleration rate for stopping the vehicle at a selected one of a plurality of predetermined positions along the platform 9. The predetermined positions may be depicted as each of the cross-over points of the transposed cable 4.

The relationship between transposition interval and the distance between the receiving antennas has been illustrated in FIG. 1 has a ratio of 2:1, which results in a square wave as shown. However, it may be shown that a pulse output corresponding to the count of past cross-overs may be generated for a variety of distances of separation of the antennas including separation distances which are less than L and distances which are greater than L. The desired pulsed output from the phase detector, however, is not produced if the separation distance is L itself or an exact multiple of L.

The position sensing means described in relation to FIG. 1 is disclosed in detail in the aforementioned copending patent application Ser. No. 887,825.

Figure 3:
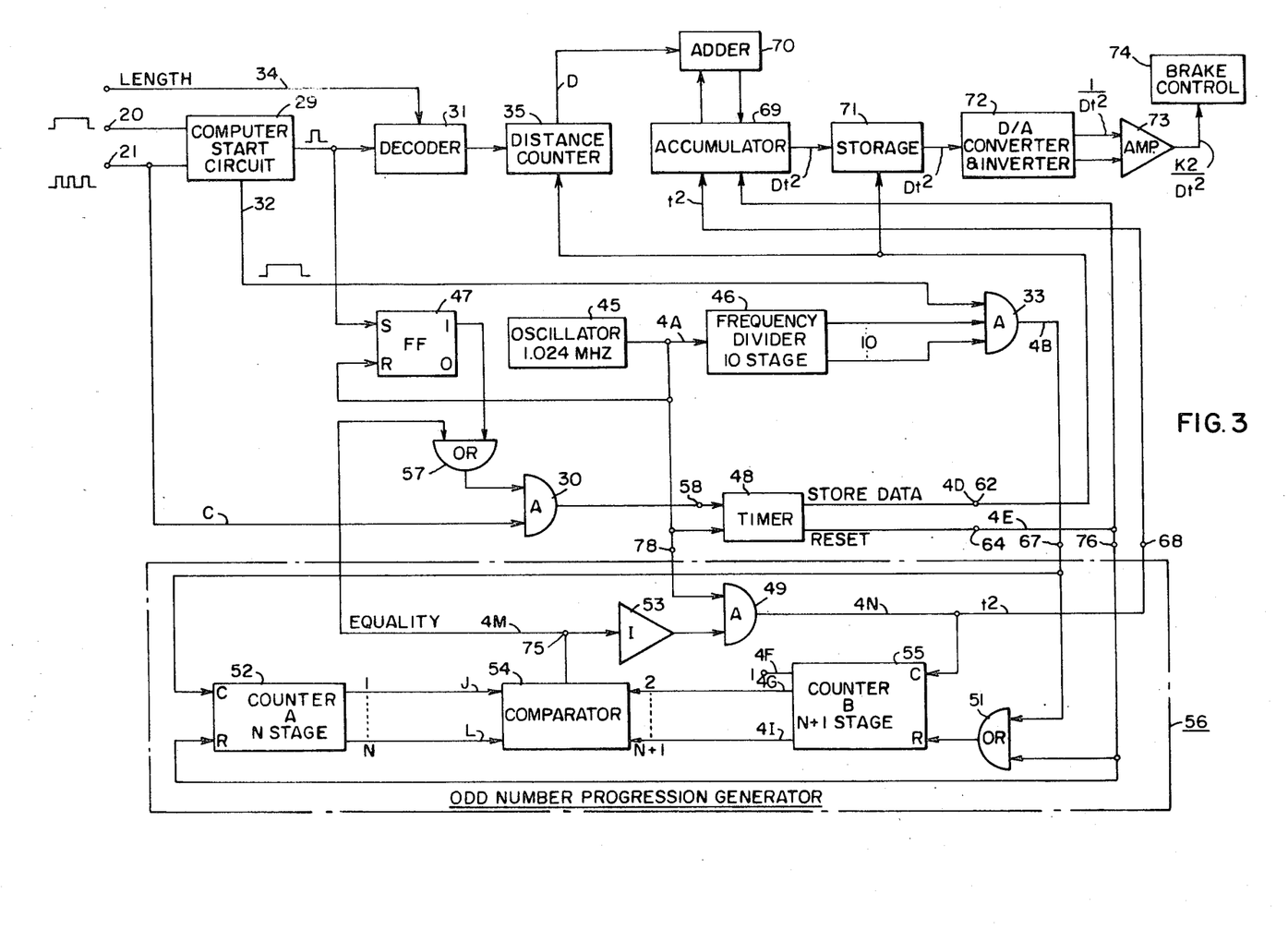
FIG. 3 is a block diagram representation which embodies the teachings of the present invention.

In reference to FIG. 3, there is illustrated a digital logic circuit which may be provided in hardware form as illustrated, or which may be provided in software form in a properly programmed general purpose digital computer. The sufficient amplitude signal provided from the amplitude detector 18 (FIG. 1) is applied to the common input terminal 20 of a computer start circuit 29 and the vehicle position or phase signal from the phase detector 19 (FIG. 1) is applied to the common input terminal 21 of the computer start circuit 29, and to a first input of an AND gate 30. The computer start circuit provides an initializing pulse for a decoder 31 and also provides a gating signal which is applied via a line 32 to a first input of an AND gate 33. The decoder 31 is a standard decoder known in the art which comprises a plurality of gates which are connected together in a predetermined manner to provide a desired coded output signal. Since the vehicles approaching the selected or predetermined stopping point may have different numbers of vehicle cars it follows that the distance a given vehicle has to travel before stopping should be modified in accordance with the number of vehicle cars. In all cases, the vehicle car which is midway between the end points of the vehicle should stop approximately at the midpoint of the platform.

A coded binary signal indicative of the length of the given vehicle is provided to the decoder 31 via the line 34. This signal may be provided by means of hard wired logic or by any known signal input means. In any event, the coded output signal from the decoder 31 varies in accordance with the different length of the vehicles. The binary signal provided at the output of the decoder is applied to a distance counter in either a serial or parallel manner and the distance counter 35 which, for example, may be a down counter, counts down in response to each position signal provided, that is, in response to each phase change sensed at the output of the phase detector. The distance counter 35 counts down in a manner which is described subsequently.

Figure 5:
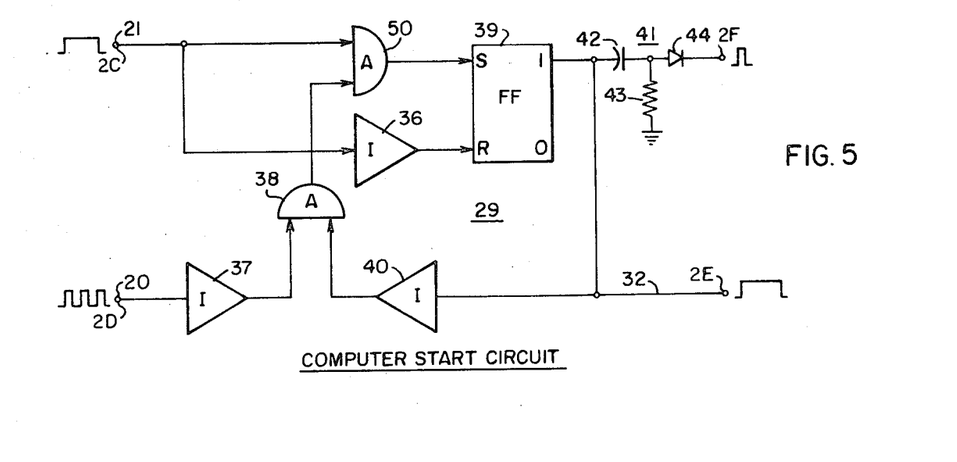
FIG. 5 is a block diagram representation of the computer start circuit shown in FIG. 3.

Refer briefly to FIG. 5 which illustrates one of many logic circuits which may be utilized as the computer start circuit illustrated in FIG. 3. The sufficient amplitude signal from the amplitude detector 18 (waveshape 2C, FIG. 2) is coupled from the terminal 21 to a first input of an AND gate 50 and to the input of an inverter 36. The phase change or vehicle position signal (waveshape 2D, FIG. 2) is coupled via the terminal 20 to a first input of an inverter 37. At a time *t*0 the sufficient amplitude signal applied to terminal 21 is at a binary one or high level enabling the AND gate 50 (waveshape 2C, FIG. 2). The phase change or vehicle position signal (waveshape 2D, FIG. 2) applied to terminal 20 is at a binary one level. This is the signal input to the inverter 37 which causes the output of the inverter 37 to be at a low or binary zero level which disables the AND gate 38, which in turn applies a disabling signal to the second input of the AND gate 50. The sufficient amplitude signal is inverted by the inverter 36 and the inverted signal is applied to the reset terminal of a bistable device such as the flip-flop 39. The inverted signal has no effect on flip-flop 39 at this time as the flip-flop 39 is initially in the reset condition. Therefore, its one output terminal is at a binary zero level which is inverted by the inverter 40 providing a binary one signal to the second input of the AND gate 38. At a time $t1$ (waveshape 2D, FIG. 2) the phase or position signal applied to the terminal 20 transverses in a negative direction and the output of the inverter 37 goes high providing a binary one signal. Since the output of the inverter 40 is at a binary one level at this time, the AND gate 38 in turn provides a binary one signal to the second input of the AND gate 50 and the output of the AND gate 50 goes to a binary one level setting the flip-flop 39 to the binary one state (waveshape 2E, FIG. 2). A differentiating network 41 comprised of a capacitor 42 and a resistor 43 differentiates the binary one signal at the one output terminal of the flip-flop 39 and the positive going portion of the differentiated wave is past by the diode 44 and the resultant pulse (waveshape 2F, FIG. 2) is the initializing signal which is applied to the decoder network 31 (FIG. 3), such that the distance the vehicle has to travel before stopping is stored in the distance counter 35.

The binary one signal provided at the one output terminal of the flip-flop 39 (waveshape 2E, FIG. 2) is the gating signal which is applied via the line 32 to the AND gate 33 (FIG. 3). This binary one signal is also applied to the input of the inverter 40 and in response to the binary one signal he output of the inverter 40 then goes to a binary zero level disabling the AND gate 38 which in turn disables the AND gate 50. It is seen therefore that once the flip-flop 39 is set to the binary one state it remains in the binary one state until the sufficient amplitude signal at terminal 21 returns to the binary zero level whereby the inverter 36 applies a binary one signal to the reset terminal of the flip-flop resetting the flip-flop. This is indicative of the vehicle having left the platform as well as having completely passed over the transposed cable 4 (FIG. 1) such that the computer start circuit 29 is once again ready to sense the sufficient amplitude signal and the phase or position signals provided at the next stopping position.

Returning to FIG. 3, the logic circuit illustrated also includes an oscillator 45 which, for example, may operate at a frequency of 1.024 MHz, that is, it provides a one-half microsecond pulse every microsecond. The control or clock pulses provided by the oscillator 45 are coupled to a frequency divider 46, a flip-flop 47, a timer 48, and an AND gate 49. The frequency divider 46 may, for example, be a 10 stage divider. The one output terminals of the ten stages of the divider are coupled to the remaining inputs of the AND gate 33. As was explained before, a gating signal is applied via the line 32 from the computer start circuit 39 to the AND gate 33. This signal enables the AND gate 33 only during the time the vehicle travels over the transposed cable 4. Since the oscillator 45 is always providing control or clock pulses and the frequency divider 46 in turn is responding to these clock pulses and counting to provide output signals to the AND gate 33, the AND gate 33 is enabled only during the time that the vehicle senses the position signals, that is, the AND gate 33 supplies output signals only during the time that the vehicle is traveling over the transposed cable. Since the frequency divider 46 has 10 stages it provides a maximum count of 1,024. Therefore, if the AND gate 33 is wired to provide a binary one signal at its output only in response to the divider reaching a count of 1024, it then provides one 1 microsecond pulse approximately every millisecond at its output, and this ½ microsecond pulse every millisecond is a timing signal for the logic circuit. The timing signal is provided to a first input terminal of an OR gate 51 and to the clock terminals of an N stage counter 52 which is also termed the A counter. The A counter 52, OR gate 51, AND gate 49, inverter 53, comparator 54 and N+1 stage counter 55 which is termed the B counter form the logic circuit 56 which is a predetermined number progression generator such as an odd number progression generator. The odd number progression generator 56 provides the $2n-1$ pulses needed to compute $t^2$ as was explained in reference to formula (5) which is used in computing the deceleration of the vehicle. The manner in which the predetermined or odd number progression of pulses is provided by the generator 56 is described shortly.

The timer 48 provides a store data pulse and a reset signal. These signals are provided in response to the phase or position signals. As was explained previously, the position signal is applied to a first input of the AND gate 30 (waveshape 4C, FIG. 4). The second input to the AND gate 30 is from an OR gate 57. The OR gate 57 provides a binary one input signal in response to the flip-flop 47 being in the one state which occurs when the computer start circuit 29 provides an initializing pulse to the set input of the flip-flop 47 or alternatively the OR gate 57 provides a binary one output in response to a binary one or equality signal being applied to its second input from the comparator 54. The operation of the comparator 54 is described subsequently. In response to the two inputs of the AND gate 30 being concurrently in the one state a binary one signal is applied to the first input of the timer 48. The signal provided is the position signal as the comparator circuit 54 is initially providing a binary one signal at its output. The second input to the timer 48 is the one microsecond clock pulses provided by the oscillator 45.

Figure 6:
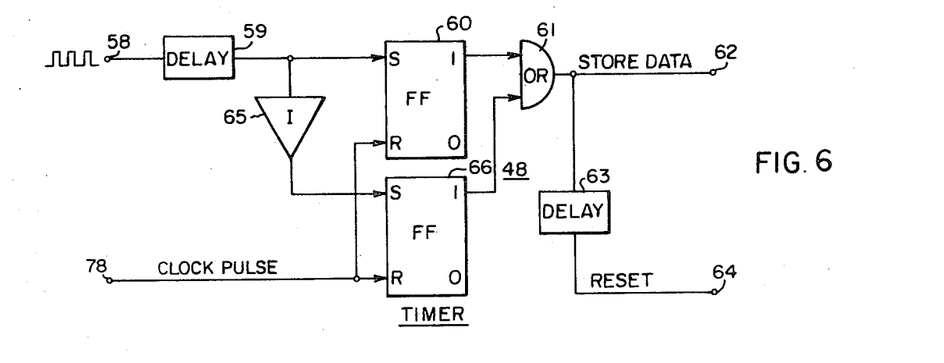
FIG. 6 is a block diagram representation of the timer illustrated in FIG. 3.

Refer briefly to FIG. 6 which is a detailed block diagram representation of one circuit which may be used as the timer circuit 48 in the practice of the invention. The position signals are applied to an input terminal 58 and are delayed by a delay network 59 a finite amount of time prior to their application to the set terminal of a flip-flop 60. The flip-flop 60 is set in response to the positive going edge of the position signals and the resultant binary one signal at the one output terminal of the flip-flop 60 is applied to the first input of an OR gate 61 which results in the store data pulse being provided at an output terminal 62 (waveshape 4D, FIG. 4). The store data pulse is delayed a finite amount of time in a delay network 63 and provides a reset signal at a time $t2$ (waveshape 4E, FIG. 4) at an output terminal 64. The flip-flop 60 is reset by the clock pulse from the oscillator 45 (see FIG. 3). An inverter 65 inverts the delayed position signal from the delay network 59. Therefore, on the positive going edge of the position or phase signal a negative going edge is applied to the set terminal of flip-flop 66, and the flip-flop 66 therefore remains in the binary zero state. When the vehicle position or phase signal applied to the input terminal 58 traverses in a negative going direction at a time $t16$ (waveshape 4C, FIG. 4) a positive going edge is provided at the output of the inverter 65 setting the flip-flop 66 to the binary one state. The flip-flop is then set to the binary zero state by the following clock pulse. The binary one signal manifested at the one output terminal of the flip-flop 66 in response to the negative-going edge of the position signal applied to terminal 58 is applied to the second input terminal of the OR gate 61. Therefore, it is seen that in response to each phase change, that is, a positive or negative going edge of the position signal applied to terminal 58 a pulse is provided at the output of the OR gate 61. This pulse is then coupled to the output terminal 62 as the store data pulse (waveshape 4D, FIG. 4) and is delayed through the delay network 63 and is coupled to an output terminal 64 as a reset pulse (waveshape 4E, FIG. 4). The functions of these pulses is made clear from what follows.

Returning to FIG. 3, the odd number progression generator 56 has applied to an input terminal 67 the timing pulses from the AND gate 33. Each of these timing pulses is representative of the time $t$ used in the deceleration formula and the generator 56 squares $t$ by forming a predetermined or odd number progression grouping of pulses. For example, if three timing pulses $t$ are provided in the interval between position signals, $t^2 = 9$. Therefore, during the time interval between position signals, the generator 56 provides at an output terminal 68, nine pulses which are applied to an accumulator 69.

In response to the first of these pulses applied to the accumulator 69 which, at this time, has the number zero stored in it, applied a signal indicative of zero to an adder 70 which adds zero to the distance D which is stored in the mounter 35. The result of the addition, D, is then stored back in the accumulator 69. Therefore, in response to the first pulse, the accumulator 69 now has the distance D stored in it. In response to the second pulse applied to the accumulator 69 the distance D in the accumulator is added to the distance D in the counter and the sum 2D is then stored back in the accumulator 69. In response to the third pulse, the accumulator supplies the number 2D to the adder 70 which adds it to the number D stored in the distance counter 35 and the number 3D is then stored in the accumulator, and so on. Therefore, it is seen that a summation is provided of the number D stored in the distance counter 35, with the number stored in the accumulator with the resultant summation then being stored back in the accumulator. Therefore, the output signal from the accumulator at a given time is representative of the multiplication $Dt^2$. It is readily seen that this multiplication is performed as set forth in equation (9). In response to a store data pulse from the timer 48 this signal is then transferred to a storage device 71. The storage device 71 may have the same number of stages as the accumulator 69 or it may have a lesser number of stages, that is, the storage device 71 may respond to only the signals stored in the most significant stages of the accumulator depending on the degree of accuracy needed in the computation of the number $Dt^2$.

The storage device 71 then supplies its output signal either in parallel or serial form to a digital-to-analog (D/A) converter and inverter 72. The output from the device 72 is an analog representation of the quantity $b/Dt^2$ which in turn is supplied as an input to an amplifier 73. The amplifier 73 supplies the operating coefficient K2 as well as compensating for any non-linearities and amplification factors needed to compensate for system parameters and to drive the break control unit 74 of the vehicle. The input signal to the break control unit 74 being the analog representation of the quantity $K2/Dt^2$, which is the deceleration required for the vehicle. This was shown by the mathematical proof of the deceleration equation as described earlier in the specification.

The operation of the predetermined or odd number progression generator 56 will now be described in detail to show how the odd progression grouping of pulses, which is the square of the number of timing pulses applied to the generator 56, is obtained. A reset signal (waveshape 4E, FIG. 4) from the timer 48 is applied to an input terminal 76 of the generator 56. This reset signal is in turn applied to a second input of an OR gate 51 and the reset terminal of the A counter 52. In response to the reset signal, the B counter 55 has its first stage set to a binary one condition and the remaining of its stages 2 through $n+1$ set to a binary zero condition. See waveshapes 4F–4I, respectively, FIG. 4, where waveshape 4F (B1) is indicative of the signal output of the first stage and waveshape 4I (B4) is indicative of the signal output of the Nth+1 stage when the counter is comprised of four stages. In the A counter 52 the stages 1 through N are each set to a binary zero condition. See waveshape, respectively, FIG. 4, where waveshape 4J (A1) is indicative of the signal output of the first stage and waveshape 4K (A3) is indicative of the signal output of the Nth stage when the counter is comprised of three stages. As may be seen from the drawing, the first stage of the B counter 55 is not connected to the comparator 54. However, the stages 2 through N+1 are connected to the comparator and they are compared with the stages 1 through N, respectively, of the A counter 52. When the stages 2 through N+1 of the B counter 55 have like binary signal levels as the stages 1 through N, respectively, of the A counter 52, a binary one or high signal indicative of equality is provided at an output terminal 74 of the comparator 54. This signal is applied to the inverter 53 and also to a second input of the OR gate 57. The equality or binary one signal at the input of the inverter 53 provides a binary zero or low signal at the output of the inverter 53 which is applied to a second input of the AND gate 49. As was stated earlier, the signals applied to the first input of the AND gate 49 are the one-half microsecond control or clock pulses from the oscillator 45. It is seen therefore that the AND gate 49 provides one-half microsecond clock pulses at its output only during the time interval that there is an inequality sensed by the comparator 54. The clock pulses appearing at the output of the AND gate 49 are the odd number progression grouping of pulses representative of the quantity $t^2$. The odd number progression grouping of clock pulses are applied to the accumulator 69, as was stated earlier, and also to the clock terminal of the B counter 55. The timing signals $t$ from the AND gate 33 are applied to the OR gate 51 and to the clock terminal of the A counter 52. It is seen therefore that the B counter 55 is reset in response to the reset signal or to a timing signal dependent upon whichever occurs first, and the A counter 52 is reset in response to the reset signal only. The B counter 55 counts in response to the odd progression number of clock pulses provided at the output of the AND gate 49 and the A counter 52 counts in response to the timing signals applied from the AND gate 33.

Figure 4:
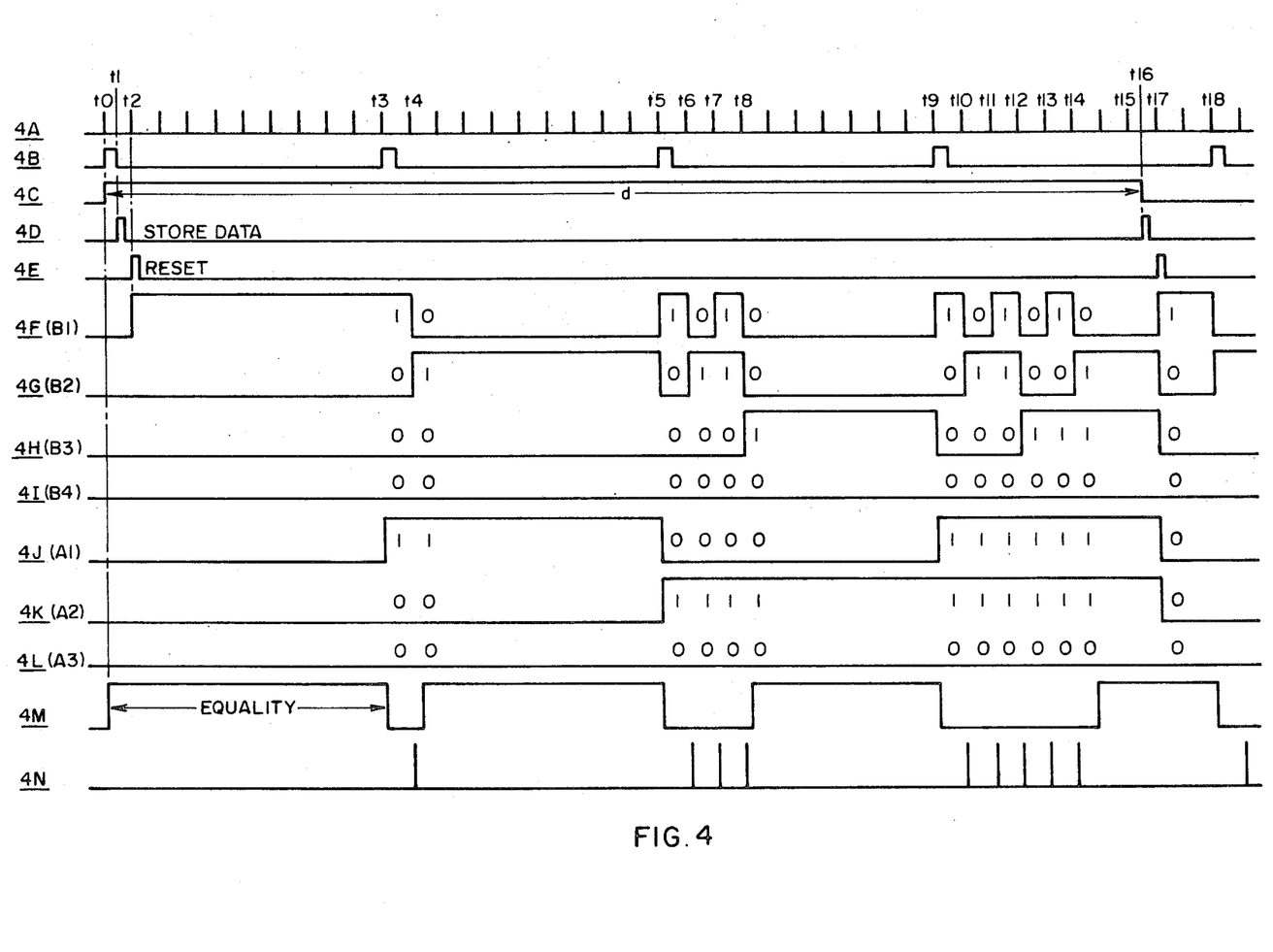
FIG. 4 is a waveform relationship helpful in the understanding of the block diagram of FIG. 3.

The operation of the odd progression generator 56 will now be described for the condition in which three timing pulses are applied to the generator 56 which in turn provides nine pulses in an odd number progression grouping at the output terminal 68 of the generator. This is indicative of the squaring of the three input timing pulses. Refer now to FIG. 4 in conjunction with FIG. 3. At a time $t0$, a timing pulse is first generated. This timing pulse (waveshape 4B, FIG. 4) is applied concurrently to the reset stage of the counter A and to the OR gate 51 which in turn applies the timing pulse to the reset terminal of the B counter 55. In response to this signal the A counter 52 and the B counter 55 are each reset. The stages B2, B3, and B4 of B counter 55, which correspond to the waveshapes 4G, 4H and 4I (FIG. 4), respectively, are all at the binary zero level at this time as are the stages A1, A2 and A3 of the A counter 52 which correspond to the waveshapes 4J, 4K, 4L, (FIG. 4), respectively. The equality signal therefore is high at this time and the inverter 53 provides a low or binary zero input to the AND gate 49 whereby no clock pulses (waveshape 4A, FIG. 4) are applied to the accumulator 69 or to the B counter 55.

Essentially at the time $t0$, the position or phase signal (waveshape 4C, FIG. 4) goes from a zero to a binary one level which is indicative of sensing one of the predetermined positions along the transposed cable 4. In response to this phase change or position sensing the store data pulse is provided at time $t1$ (waveshape 4D, FIG. 4) and the reset pulse is provided at time $t2$ (waveshape 4E, FIG. 4). The store data pulse is applied to the distance counter 35 and the distance the vehicle has to travel to its stopping position is stored. The store data pulse is also applied to the storage device 71 which then stores the number stored in accumulator 69, which at this time is zero. In response to the reset signal at time $t2$ (waveshape E, FIG. 4) the B counter 55 and A counter 52 are reset. At this time the first stage (B1) of the B counter 55 is set to the binary one state and the remaining stages B2 through B4 of B counter 55 are set to the binary zero state, as is seen from the waveshapes 4F through 4I respectively (FIG. 4). The stages A1 through A3 of A counter 52 are set to the binary zero state (waveshapes 4J through 4L, FIG. 4). Therefore, the comparator 54 senses an equality and the inverter 53 provides a binary zero signal to the AND gate 49 such that clock pulses are prevented from being applied to the clock terminal of the B counter 55 or to the accumulator 69. The B counter 55 therefore is inhibited from counting until the AND gate 49 is completely enabled. This does not occur until the following timing signal is applied. This timing signal (waveshape 4B, FIG. 4) which occurs at the time $t3$ is the first of the three timing signals which are to be counted by the A counter 52. At this time ($t3$) the first stage of the A counter 52 is set to the binary one state (waveshape 4J, FIG. 4). The second stage of the binary counter B is at this time in a binary zero state (waveshape 4G, FIG. 4). Therefore, the comparator 54 senses an inequality and a binary zero is provided at its output terminal 75 (waveshape 4M, FIG. 4). The inverter 53 in turn provides a binary one signal to the second input terminal of the AND gate 49 enabling this AND gate and the first clock pulse in the odd number progression grouping, is provided to the accumulator 69 and concurrently to the clock terminal of the counter 55 (waveshape 4N, FIG. 4). The clock pulse provided to the accumulator 69 causes the number zero in the accumulator to be added to the distance D in the distance counter and the distance D is then stored back in the accumulator 69 from the adder 70. The clock pulse also causes the counter B to increase in count by a count of one, that is, the first stage B1 of the counter is switched from a binary one to a binary zero level at time $t4$ (waveshape 4F, FIG. 4) and the stage B2 of B counter 55 is switched from a binary zero to a binary one level (waveshape 4G, FIG. 4). Therefore, the second stage of the A counter 55 is now at the same binary level as the first stage of B counter 52. The comparator 54 now senses equality and provides a binary one signal at its output terminal. This occurs shortly after the time interval $t4$ during which the first clock pulse in the odd number progression was generated (waveshape 4M, FIG. 4).

The B counter 55 is now inhibited from counting any further until the comparator once again senses an inequality. This occurs at a time t5 when the second timing pulse (waveshape 4B, FIG. 4) is generated. In response to the second timing pulse generated the stage A1 of A counter 55 switches from a binary one to a binary zero level (waveshape 4J, FIG. 4) and the stage A2 of the counter 52 switches from a binary zero to a binary one level (waveshape 4K, FIG. 4). The comparator 54 now senses an inequality as the stage B3 of the B counter 55 is at a binary zero (waveshape 4H, FIG. 4) and the stage A2 of the counter 52 is at a binary one level (waveshape K, FIG. 4). Therefore, at a time $t6$ the count of the counter B is increased by the count of one and a clock pulse in the odd number progression generator is passed by the AND gate 49 to the accumulator 69 so a summation may be performed. At a time $t7$ the B counter 55 is again increased in count by a count of one and the comparator continues to sense an inequality between the compared stages of the A counter 52 and the B counter 55 as may be seen in FIG. 4, and the clock pulse at time $t7$ is passed by the AND gate 49 to increase the count of B counter 55 and is applied to the accumulator 69 so that a summation may be performed. At a time $t8$ the count of the B counter 55 is again increased by a count of one and this pulse is also applied to the accumulator 69 so that a summation may be performed, and at this time the counts in the A counter 52 and the B counter 55 coincide and the comparator provides an equality signal, a short time after $t8$, at a binary one level at its output terminal 74 (waveshape M, FIG. 4). The inverter 53, applies a binary zero signal to the AND gate 49 inhibiting this AND gate which prevents the counter B from further counting and the accumulator 69 from receiving further pulses.

In response to the third timing signal at a time t9 the B counter 55 is once again reset and the A counter 52 is increased in count by a count of one. At this time there is an inequality in count between the counters A and B as may be seen by referring to FIG. 4. For example, the counter stage B2 (waveshape 4J, FIG. 4) is a binary zero level whereas the stage A1 (waveshape 4J, FIG. 4) of the A counter 52 is at a binary one level. Therefore, the clock pulse (waveshape 4A, FIG. 4) occurring at time t10 is passed by the AND gate 49 which in turn increases the count of the B counter 55 by a count of one and causes the accumulator 69 to store the result of another summation. At time t11 the comparator continues to sense an inequality in count and the AND gate 49 provides another clock pulse to the B counter 55 to increase its count and the same clock pulse is applied to the accumulator 69 to store the result of another summation. At the time t12 another clock pulse is passed by the AND gate increasing the count of the counter B by a count of one and is applied to the accumulator 69 causing the accumulator 69 to store the result of yet another summation. At a time t13 the comparator 54 continues to sense an inequality in count and the AND gate 49 passes a clock pulse to the B counter 55 increasing the count by a count of one and to the accumulator 69 causing it to store the result of another summation. At time t14 the comparator 54 continues to sense an inequality in count and the AND gate 49 passes another clock pulse which increases the count in B counter 55 by a count of one and causes the accumulator 69 to store the result of another summation. Shortly after the time t14, the comparator 54 senses an equality in the count and the inverter 53 in turn provides a binary zero signal to the AND gate 49 thereby inhibiting the AND gate 49 and causing the counter B to no longer count, and the accumulator 69 to receive no more clock pulses. At a time t15 the phase or position signal changes from a binary one to a binary zero level (waveshape 4C, FIG. 4) and in response to this a stored data pulse is generated at a time t16 (waveshape 4D, FIG. 4) which is applied to the storage device 71 which causes the summation signal stored in the accumulator 69 to be stored in the storage device 71. The store data pulse is also applied to the distance counter 35 to decrease its count by a count of one. As was explained before, the signal in the storage device 71 is than applied to the D/A converter and inverter 72 and in turn to the amplifier 73 which applies the deceleration signal $K2/Dt^2$ to the break control unit 74.

At a time t17 the reset signal is generated (waveshape 4E, FIG. 4) which resets the counters 55 and 52 to their original states and equality is again sensed by the comparator 54 and the AND gate 49 is inhibited. At a time t18 another timing signal (waveshape 4B, FIG. 4) is generated and the process again repeats itself. It is seen therefore that in response to the three timing signals at the times t3, t5 and t9, respectively, as shown in FIG. 4 that an odd number progression grouping of nine pulses was generated (waveshape 4N, FIG. 4). This odd number progression grouping of pulses is indicative of the square of the number of timing pulses provided, that is, in response to the three timing pulses, nine clock pulses were provided. These nine clock pulses, in turn, were applied to the accumulator 69 causing it to store the results of the successive summations of the distance stored in the distance counter 35 which is in accordance with the operation described in the derivation of the deceleration formula presented earlier in the specification.

Figure 7:
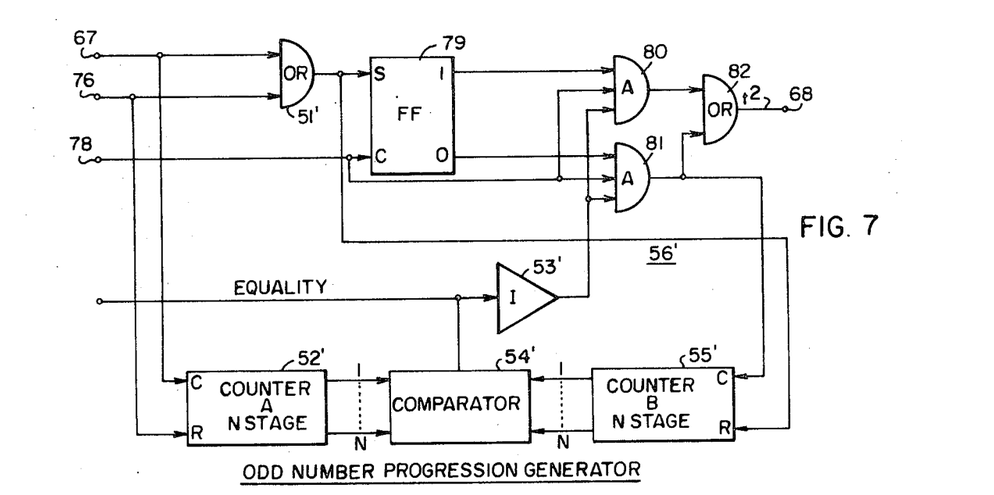
FIG. 7 is a block diagram representation of an alternative embodiment of the odd number progression generator illustrated in FIG. 3.

In FIG. 7 there is illustrated an alternative embodiment 56' which may be used in place of the odd number progression generator illustrated in FIG. 3. The A and B counters 52' and 55', respectively, in this instance are each N stage counters. Like stages in each counter are compared for like binary states by the comparator 54', that is, the first stage of A counter 52' is compared with the first stage of the B counter 55' and so on down to the Nth stage where the Nth stage of the A counter 52' is compared with Nth stage of the B counter 55'. A flip-flop 79 is included in this embodiment of the odd number progression generator, which essentially performs the same function as the first stage in the B counter 55 in the odd number progression generator 56 as shown in FIG. 3. The waveshape 4F (B1) of FIG. 4 corresponds to the waveshape present at the 1 output terminal of flip-flop 79 for the different time periods shown. The waveshapes 4G–4I of FIG. 4 are indicative of the waveshapes present at the 1 output terminals of the states 1–3, respectively, of the B counter 55', whereas the waveshapes 4J–4L of FIG. 4 are indicative of the waveshapes present at the 1 output terminals of the stages 1–3, respectively in the A counter 52'.

In response to a reset signal being applied to the terminal 76 the A counter 52' has all of its stages set to the binary zero state, and the OR gate 51' concurrently applies the reset signal to the set terminal of flip-flop 79 and for the reset terminal of all stages of the B counter 55'. In response to the signal from the OR gate 51' the flip-flop 79 is set to the binary one state and all stages of the B counter 55' are set to the binary zero state. This corresponds to the time t2 as illustrated in FIG. 4. At this time the comparator 54' senses equality in like stages of the counters, and in response to the binary one signal indicative of equality, the inverter 53' applies a disabling binary zero signal to the AND gates 80 and 81. The AND gate 80 also has signal inputs provided from the clock pulse terminal 78 and the 1 output terminal of flip-flop 79. The AND gate 81 also has signal inputs provided from the clock pulse terminal 78 and the zero output terminal of the flip-flop 79. The terminals of both AND gates provide inputs to the OR gate 82 which has its output connected to the terminal 68, which is connected to the accumulator 69. As was described earlier, it is at the terminal 68 where the odd progression grouping of pulses indicative of $t^2$ is provided. The AND gate 81 also has its output connected to the clock terminal of the B counter 55'.

At a time t3 the timing signal (waveshape 4B, FIG. 4) is concurrently applied to the OR gate 51' and the clock terminal of the A counter 52'. In response to the timing signal the A counter 52' increases in counter by a count of one, and the flip-flop 79 is set to the binary one state. The comparator 54' senses inequality in the first stages of the A and B counters and in response thereto, the inverter 53' applies a binary one signal to the AND gates 80 and 81. The AND gate 81 is disabled at this time, however, as the flip-flop 79 is in the binary one state. The AND gate 80 has two of its inputs at a binary one level, and in response to the next clock pulse (time $t4$, FIG. 4), the AND gate 80 provides a pulse to the OR gate 82 which in turn provides the pulse to the terminal 68. This is the first pulse in the odd number progression which is applied to the accumulator 69 (waveshape 4N, FIG. 4). In response to the same clock pulse the flip-flop 69 is switched to the binary zero state enabling the AND gate 81 such that the following clock pulse is provided to the B counter 55' increasing its counter by a count of one. The comparator now senses equality and in turn the inverter 53' applies an inhibiting binary zero signal to the AND gates 80 and 81. For the remaining time periods, the odd number progression grouping of pulses is provided as shown by waveshape 4N, FIG. 4.

In summary, a logic circuit has been illustrated in which a predetermined or odd number progression grouping of pulses, which is indicative of the square of the number of timing pulses applied to the circuit, is provided. This odd number progression grouping of pulses is operative with a distance counter, an adder and an accumulator to provide successive summations of the distance stored in the distance counter. Each successive summation is then stored in the accumulator and added to the number in the distance counter in response to each successive clock pulse in the odd number progression. The summation signal stored in the accumulator is then transferred to a storage device which in turn is coupled to a D/A converter and inverter device which provides an analog signal at its output which is proportional to the quantity $1/Dt^2$ which quantity is applied to an amplifier which has scaling and non-linearity factors equal to the constant K2 and provides at its output the deceleration signal which is equal to $K2/Dt^2$.

The method and apparatus disclosed for providing a vehicle control signal may be used in conjunction with the vehicle control system as set forth in the aforementioned U.S. Pat. No. 3,593.022.

I claim as my invention:

1. In a vehicle control system, the combination comprising:
   means for providing periodic control pulses;
   first means responsive to the provision of said periodic control pulses for providing a predetermined number progression of said periodic pulses;
   means for providing vehicle position signals, in response to sensing a vehicle's position relative to a vehicle travel path;
   second means for storing the initial distance that a vehicle has to travel to a predetermined position, and for counting in response to the provision of said vehicle position signals for providing successive counts indicative of the remaining distance said vehicle has to travel to said predetermined position;
   third means operative with said second means and responsive to each pulse in said predetermined number progression, during the time interval between the provision of successive one of said vehicle position signals, for forming a summation of the count stored in said second means; and
   means for providing a vehicle control signal in response to the formation of said summation.

2. In a vehicle control system for a vehicle traveling along a vehicle travel path, the combination comprising:
   first means for providing a vehicle position signal each time said vehicle senses one of a plurality of predetermined positions along said vehicle travel path;
   second means for storing the initial distance that said vehicle has to travel to a selected one of said predetermined positions in response to the provision of a given one of said vehicle position signals, and for counting in response to said vehicle position signals for providing successive counts indicative of the remaining distance said vehicle has to travel to said selected one of said predetermined positions;
   third means for providing periodic clock pulses;
   fourth means for providing a timing signal in response to the provision of a predetermined number of said periodic clock pulses;
   fifth means for providing a predetermined number progression grouping of said periodic clock pulses during the time interval between said vehicle position signals, with each successive group of clock pulses in the progression being provided at a time determined by said timing signal;
   sixth means operative with said second means and responsive to each clock pulse in said predetermined number progression grouping for forming a summation of the count stored in said second means; and
   means responsive to the formation of said summation for providing a vehicle control signal.

3. The combination claimed in claim 2, with said vehicle control signal comprising a vehicle deceleration command for stopping said vehicle at said selected one of said predetermined positions.

4. In a vehicle control system which provides a vehicle deceleration command for a vehicle relative to a stopping position along a vehicle travel path, the combination comprising:
   means for providing a vehicle position signal each time said vehicle senses one of a plurality of predetermined positions along said vehicle travel path;
   a distance counter in which the initial distance said vehicle has to travel to said stopping position is stored in response to the provision of a given vehicle position signal, and which counts in response to said vehicle position signals for providing successive counts indicative of the remaining distance said vehicle has to travel to said stopping position;
   means for providing periodic clock pulses;
   means responsive to a predetermined number of said periodic clock pulses for providing a timing signal;
   a first counter which counts said clock pulses during the time interval between said timing signals;
   a second counter which counts said timing signals during the time interval between said vehicle position signals;
   a comparator for sensing like signal levels in predetermined stages of said first and second counters;
   means for blocking the application of said count pulses to said first counter in response to said comparator sensing like signal levels in the predetermined stages of said first and second counters;
   an accumulator in which a number indicative of the count in said distance counter is initially stored concurrent with the application of the first clock pulse to said first counter;

an adder which adds the count stored in said counter to the number stored in said accumulator concurrent with the application of each of the succeeding clock pulses to said first counter, with the result of each addition being the number which is next stored in the accumulator for forming a sum signal; and means responsive to said sum signal for providing a vehicle control signal.

5. The combination of claim 4 wherein said vehicle control signal is a deceleration signal.

6. In a vehicle control system for a vehicle traveling along a vehicle travel path, a method of providing a vehicle control signal comprising the steps of:

providing a vehicle position signal each time said vehicle senses one of a plurality of predetermined positions along said vehicle travel path;

storing in a counter the initial distance said vehicle has to travel to a selected one of said predetermined positions in response to the provision of a given vehicle position signal, with said counter providing successive counts indicative of the remaining distance said vehicle has to travel to said predetermined position in response to the provision of each of said position signals;

providing periodic clock pulses;

providing a timing signal in response to a predetermined number of said periodic clock pulses;

providing a predetermined number progression grouping of said periodic clock pulses during the time interval between the provision of successive vehicle position signals, with each successive group of clock pulses in the progression provided at a time determined by said timing signal;

providing a sum signal by forming a summation of the count stored in said counter in response to each clock pulse in said predetermined number progression grouping; and providing said vehicle control signal in response to the provision of said sum signal.

7. The method of claim 6 including the step of:

deriving a deceleration signal for said vehicle in response to the provision of said vehicle control signal.

8. A method of providing a vehicle control signal comprising the steps of:

providing periodic control pulses:

providing a predetermined number progression grouping of said periodic control pulses;

providing vehicle position signals indicative of a vehicle's position relative to a vehicle travel path;

storing in a counter a first count indicative of the initial distance that a vehicle has to travel to a predetermined position;

modifying said first count stored in said counter to be indicative of the remaining distance said vehicle has to travel to said predetermined position in response to said counter counting said vehicle position signals;

forming a summation of the count stored in said counter in response to the provision of each pulse in said predetermined number progression grouping of said control pulses during the interval of time between the provision of successive vehicle position signals; and providing a vehicle control signal in response to the formation of said summation.

* * * * *